(12) United States Patent
Lee et al.

(10) Patent No.: US 10,047,180 B2
(45) Date of Patent: Aug. 14, 2018

(54) VINYL-BASED THERMOPLASTIC RESIN COMPOSITION, METHOD FOR MANUFACTURING THEREOF AND VINYL-BASED THERMOPLASTIC RESIN MANUFACTURED THEREFROM

(71) Applicant: LG CHEM, LTD., Seoul (KR)

(72) Inventors: Se Woong Lee, Daejeon (KR); Seong Yong Ahn, Daejeon (KR); Kun Ji Kim, Daejeon (KR); Kyung Hyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 15/105,983

(22) PCT Filed: Oct. 7, 2015

(86) PCT No.: PCT/KR2015/010626
§ 371 (c)(1),
(2) Date: Jun. 17, 2016

(87) PCT Pub. No.: WO2016/056848
PCT Pub. Date: Apr. 14, 2016

(65) Prior Publication Data
US 2017/0260308 A1 Sep. 14, 2017

(30) Foreign Application Priority Data
Oct. 8, 2014 (KR) ........................ 10-2014-0136058

(51) Int. Cl.
*C08F 214/06* (2006.01)
*C08K 3/32* (2006.01)

(52) U.S. Cl.
CPC .............. *C08F 214/06* (2013.01); *C08K 3/32* (2013.01); *C08K 2003/324* (2013.01)

(58) Field of Classification Search
CPC .... C08F 214/06; C08K 3/32; C08K 2003/324
See application file for complete search history.

(56) References Cited

U.S. PATENT DOCUMENTS

| | | | | |
|---|---|---|---|---|
| 4,283,514 A | * | 8/1981 | Weimer | C07C 37/14 524/349 |
| 6,022,932 A | * | 2/2000 | Ooura | B01J 19/18 526/62 |
| 2002/0099153 A1 | | 7/2002 | Usuki et al. | |
| 2015/0065651 A1 | * | 3/2015 | Takamido | C08F 279/06 525/67 |

FOREIGN PATENT DOCUMENTS

| | | |
|---|---|---|
| EP | 0805168 A1 | 11/1997 |
| JP | 11-130803 A | 5/1999 |
| JP | 2002-332308 A | 11/2002 |
| KR | 10-2005-0027582 A | 3/2005 |
| KR | 10-2011-0006223 A | 1/2011 |
| KR | 20110006223 * | 1/2011 |
| KR | 10-2012-0007227 A | 1/2012 |
| WO | 2013092729 A1 | 6/2013 |
| WO | 2016/056848 A1 | 4/2016 |

OTHER PUBLICATIONS

Database WPI, "Manufacture of bulk polymerized polyvinyl chloride, involves adding vinyl chloride monomer and polymerization initiator to bulk polymerized seed, polymerizing and adding neutralizing agent", XP002773938, Week 201153, Thomson Scientific, London, GB, AN 2011-B10857.
Ghasemi, et al.: "Synthesis of Iron-Amino Acid Chelates and Evaluation of Their Efficacy as Iron Source and Growth Stimulator for Tomato in Nutrient Solution Culture", XP035132190, Journal of Plant Growth Regulation, Springer, vol. 31, No. 4, Feb. 2, 2012, pp. 498-508.

* cited by examiner

*Primary Examiner* — Robert S Jones
(74) *Attorney, Agent, or Firm* — Dentons US LLP

(57) ABSTRACT

The present invention relates to vinyl-based thermoplastic resin composition having excellent thermal stability, which comprises a metal complex agent, and a first vinyl-based monomer and a second vinyl-based monomer having different iron ion concentration from each other, a method for manufacturing thereof, and vinyl-based thermoplastic resin manufactured therefrom. The accompanying vinyl-based thermoplastic resin composition can enhance thermal stability, and the vinyl-based thermoplastic resin manufactured from the composition may have excellent thermal stability. Thus, it can be easily applied to industries requiring thereof, in particular, industries of vinyl-based thermoplastic resin and its mold processed goods.

27 Claims, No Drawings

VINYL-BASED THERMOPLASTIC RESIN COMPOSITION, METHOD FOR MANUFACTURING THEREOF AND VINYL-BASED THERMOPLASTIC RESIN MANUFACTURED THEREFROM

CROSS-REFERENCE(S) TO RELATED APPLICATION

This application is a National Stage Entry of International Application No. PCT/KR2015/010626, filed on Oct. 7, 2015, and claims the benefit of and priority to Korean Application No. 10-2014-0136058, filed on Oct. 8, 2014, both of which are incorporated herein by reference in their entirety for all purposes as if fully set forth herein.

TECHNICAL FIELD

Field of the Invention

The present invention relates to vinyl-based thermoplastic resin composition having excellent thermal stability, which comprises a metal complex agent, and a first vinyl-based monomer and a second vinyl-based monomer having different iron ion concentration from each other, a method for manufacturing thereof, and a vinyl-based thermoplastic resin manufactured therefrom.

Background Art

As a representative vinyl-based thermoplastic resin, there is a vinyl chloride-based resin, and the vinyl chloride-based resin is a polymer containing vinyl chloride 50% or more. It is applied to various field because it is cheap, easy to control hardness, and possible to be applied to most of processing devices. In addition, it is widely used in many fields because it can provide shaped articles having excellent physical and chemical properties, for example, mechanical strength, weather resistance, chemical resistance and the like.

This vinyl chloride-based resin is manufactured by using a vinyl chloride-based monomer, and the vinyl chloride-based monomer is manufactured through largely two pathways. One is a process of manufacturing the resin by using acetylene as a source material and hydrochlorinating thereof, and the other is a process of manufacturing ethylene dichloride (EDC) by oxochlorinating or chlorinating ethylene and then pyrolizing thereof to obtain hydrochloride and the vinyl chloride monomer. Of them, in the process of manufacturing the vinyl chloride-based monomer from ethylene, a technique utilizing a catalyst to increase product yield had been achieved from the past. The most commonly used catalysts are made from rhodium (Rh), platinum (Pt), iron (Fe), copper (Cu), nickel (Ni) and the like, and those are functioning to increase production efficiency of the vinyl chloride monomer.

The catalysts are normally not consumed during reaction because the catalysts theoretically function as a catalyst, but the catalyst metals are flowed into a resin polymerization process in the form of chloride with the vinyl chloride monomer because a manufacturing process is proceeded at a condition of high acidity. Of them, transition metal compounds such as iron, copper and the like are flowed into a vinyl chloride resin, and when the compounds reach the final processing, the compounds greatly hinder performance of a metal stabilizer inserted during the processing, and also hinder weather resistance of the product together with whiteness index.

On the other hand, the vinyl chloride-based resin is manufactured by using the vinyl chloride-based monomer through emulsion polymerization, suspension polymerization, mass polymerization and the like. Of them, the mass polymerization is conducted by inserting an initiator, reaction additives and the like to the vinyl chloride-based monomer without using a medium such as water. Thus, the mass polymerization has low unit cost of production because the mass polymerization does not need separate washing and drying processes and has a commercially big advantage because it does not need a dehydrating or drying equipment.

Specifically, the mass polymerization is conducted by using a reactor equipped with a pre-polymerization reactor and a main polymerization reactor, and a particle core having polymerization conversion rate of 7% to 13% is manufactured in the pre-polymerization reactor, transferred to the main polymerization reactor, and then polymerized with the additionally inserted vinyl chloride-based monomer to manufacture the vinyl chloride-based resin having polymerization conversion rate of 70% to 85%. If the polymerization is conducted to have polymerization conversion rate of higher than 85%, productivity is reduced compared to polymerization time and heat transfer efficiency is decreased as percentage of the monomer is reduced. Accordingly, the mass polymerization is terminated in the state of low polymerization conversion rate thereby generating a large amount of unreacted vinyl chloride-based monomer. Thus, the monomer is recovered and then reused in the polymerization process as a source material.

The reused unreacted vinyl chloride-based monomer may include some of many compounds due to the additives inserted in the polymerization process, and contain a large amount of iron ions by metal chloride generated by hydrochloride formed in the polymerization process, in particular, iron(II or III) chloride.

The iron ion is oxidized in the polymerization reaction, and causes structural bonding to the vinyl chloride-based resin, thereby accelerating dehydrochlorination phenomenon. As a result, the ion causes pyrolytic reaction of the resin thereby reducing thermal stability.

Further, if the thermal stability is reduced, when producing a product by molding processing of the vinyl chloride-based resin, decoloration of the mold processed article occurs and it is difficult to color a transparent product or a colored product thereby reducing value of the product, for example, color precision.

Thus, it is needed to develop a method, which can manufacture a vinyl chloride-based resin having excellent thermal stability by the mass polymerization, which has high advantage of productivity, and therefore a product manufactured from the resin can have excellent properties.

Under the above background, the present inventors have studied a method, which can manufacture vinyl-based thermoplastic resin by the mass polymerization having high productivity, and also can obtain the vinyl-based thermoplastic resin having excellent thermal stability even though using unreacted vinyl-based monomer recovered from pre-polymerization reaction and having high iron ion concentration; manufactured vinyl-based thermoplastic resin from vinyl-based thermoplastic resin composition, which comprises the recovered unreacted vinyl-based monomer having high iron ion concentration and a new vinyl-based monomer at weight ratio of 1:1.2 to 1.8 and a metal complex agent at a certain ratio; and found that its thermal stability is excellent, thus completing the present invention.

DETAILED DESCRIPTION OF THE INVENTION

Technical Problem

In order to solve the above problems, one object of the present invention is to provide vinyl-based thermoplastic resin composition having excellent thermal stability, which comprises a metal complex agent, and the first vinyl-based monomer and the second vinyl-based monomer containing iron ions of different concentration from each other.

Another object of the present invention is to provide a method for manufacturing the vinyl-based thermoplastic resin composition, which is characterized by comprising a pre-polymerization step and a post-polymerization step, wherein the metal complex agent is inserted in at least one step of the pre-polymerization step and the post-polymerization step.

Further another object of the present invention is to provide a vinyl-based thermoplastic resin manufactured from the vinyl-based thermoplastic resin composition.

Technical Solution

In order to accomplish the objects described above, the present invention provides vinyl-based thermoplastic resin composition, which is characterized by comprising a metal complex agent 0.05 part by weight to 0.5 part by weight, based on a monomer mixture 100 parts by weight, wherein the monomer mixture comprises the first vinyl-based monomer and the second vinyl-based monomer, wherein the first vinyl-based monomer and the second vinyl-based monomer contain iron ions of different concentration from each other.

Further, the present invention provides a method for manufacturing vinyl-based thermoplastic resin composition by mass polymerization, which is characterized by comprising a pre-polymerization step of manufacturing a particle core by polymerizing the first vinyl-based monomer, the second vinyl-based monomer and a pre-polymerization initiator (Step 1); and a post-polymerization step of adding the first vinyl-based monomer, the second vinyl-based monomer and a post-polymerization initiator to the particle core and then polymerizing thereof (Step 2), wherein the metal complex agent is inserted in at least one step of the pre-polymerization step and the post-polymerization step.

Moreover, the present invention provides a vinyl-based thermoplastic resin manufactured from the vinyl-based thermoplastic resin composition.

Advantageous Effect

The vinyl-based thermoplastic resin composition according to the present invention comprising the first vinyl-based monomer and the second vinyl-based monomer at weight ratio of 1.2 to 1.8:1, and a metal complex agent 0.05 part by weight to 0.5 part by weight, based on the two monomers 100 parts by weight has effects of removing iron ions and improving thermal stability by the metal complex agent, and reducing production cost by reusing the second vinyl-based monomer that is a unreacted monomer recovered from pre-polymerization.

Further, the method for manufacturing the vinyl-based thermoplastic resin composition through mass polymerization according to the present invention can further increase the iron removing effect of the metal complex agent by inserting the metal complex agent to the pre-polymerization step in bulk or inserting thereof to the pre-polymerization step and the post-polymerization step dividedly, thereby further increasing the thermal stability improving effect of the composition.

Thus, the vinyl-based thermoplastic resin manufactured from the composition can have excellent thermal stability, and can be easily applied to industries requiring thereof, in particular, industries of vinyl-based thermoplastic resin and its mold processed goods.

BEST MODE FOR CARRYING OUT THE INVENTION

Hereinafter, the present invention will be described in more detail in order to help the understanding of the present invention.

In this case, it should be understood that the terms or words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention provides a vinyl-based thermoplastic resin composition having excellent thermal stability, which comprises a metal complex agent, and two kinds of vinyl-based monomers having different iron ion concentration from each other.

The vinyl-based thermoplastic resin composition according to one embodiment of the present invention is characterized by comprising a metal complex agent 0.05 part by weight to 0.5 part by weight, based on a monomer mixture 100 parts by weight, wherein the monomer mixture comprises the first vinyl-based monomer and the second vinyl-based monomer, wherein the first vinyl-based monomer and the second vinyl-based monomer contain iron ions of different concentration from each other.

The first vinyl-based monomer refers to a newly used vinyl-based monomer, i.e., a pure vinyl-based monomer never went through polymerization reaction, and the second vinyl-based monomer refers to a unreacted vinyl-based monomer recovered from pre-polymerization reaction, which contains a large amount of iron ions inside thereof after went through at least one of polymerization reaction.

Specifically, the first vinyl-based monomer may be a vinyl-based monomer commonly known in the art containing iron ions 0.05 ppm to 0.1 ppm based the monomer 100 parts by weight.

The second vinyl-based monomer is a reused vinyl-based monomer went through the polymerization reaction at least one time as mentioned above, and can show 100 to 300 folds higher iron ion concentration than the iron ion concentration inside of the first vinyl-based monomer. Specifically, the second vinyl-based monomer may have iron ion concentration of 5 ppm to 30 ppm.

The monomer mixture may comprise the first vinyl-based monomer and the second vinyl-based monomer at weight ratio of 1.2 to 1.8:1. If the weight ratio of the first vinyl-based monomer and the second vinyl-based monomer is out of the range and the ratio of the second vinyl-based monomer is increased, thermal stability of the final vinyl-based thermoplastic resin manufactured by using thereof may be deteriorated, thereby deteriorating other properties such as whiteness index. If the weight ratio of the second vinyl-based monomer is out of the range and is further decreased, the production cost reduction effect of the mass polymerization may be insignificant.

On the other hand, the first vinyl-based monomer may be the one available in the market, or may be manufactured by the method commonly known in the art. If the first vinyl-based monomer is manufactured, for example, it may be manufactured by hydrochlorinating acetylene as a raw material, or oxochlorinating or chlorinating ethylene to obtain ethylenedichloride (EDC) and then pyrolizing thereof.

The second vinyl-based monomer may be a unreacted vinyl-based monomer recovered from mass polymerization of the first vinyl-based monomer, which is purchased or manufactured.

The metal complex agent according to the present invention may be contained in an amount of 0.05 part by weight to 0.5 part by weight based on the monomer mixture 100 parts by weight as mentioned above. If the metal complex agent is contained in an amount of less than 0.05 part by weight, the effect of removing iron ion inside of the second vinyl-based monomer may be insignificant, thereby the thermal stability improving effect of the finally manufactured vinyl-based thermoplastic resin may be insignificant. Further, if the metal complex agent is contained in an amount of greater than 0.5 part by weight, the iron ion removing effect may be better, but the effect may be insignificant compared to the degree of the production cost increase.

The term used in the present invention, "metal complex agent" means a molecule or an ion making a complex ion by coordinating around a metal ion, i.e., a molecule or an ion having a plurality of coordination groups making coordination bond to the metal ion in one molecule.

The metal complex agent according to the present invention may be at least one selected from the group consisting of phosphoric acid-based compound, alkali metal phosphate-based compound, aminocarboxylic acid-based compound and oxycarboxylic acid-based compound.

Specifically, the phosphoric acid-based compound may be at least one selected from the group consisting of pyrophosphoric acid, tripolyphosphoric acid, pentapolyphosphoric acid, trimetaphosphoric acid, tetrametaphosphoric acid and hexametaphosphoric acid.

The alkali metal phosphate-based compound may be at least one selected from the group consisting of disodium pyrophosphate, trisodium pyrophosphate, tetra-sodium pyrophosphate and potassium pyrophosphate.

The aminocarboxylic acid-based compound may be at least one selected from the group consisting of ethylenediamine-N-monoacetic acid, ethylenediamine-N,N'-diacetic acid and ethylenediamine-N,N,N',N'-tetraacetic acid.

The oxycarboxylic acid-based compound may be at least one selected from the group consisting of glycolic acid, gluconic acid, lactic acid, glyceric acid, tartaric acid, malic acid, salicylic acid, gallic acid and citric acid.

Further, the metal complex agent may be at least one selected from the following compounds expressed by Chemical Formulas 1 to 3:

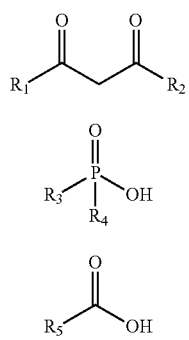

in the Chemical Formula 1, Chemical Formula 2 and Chemical Formula 3, wherein the $R_1$ to the $R_5$ are each independently $C_{1\text{-}10}$ alkyl, $C_{1\text{-}10}$ halogenated alkyl, $C_{1\text{-}10}$ aryl or $C_{1\text{-}10}$ halogenated aryl.

Further, the present invention provides a method for manufacturing the vinyl-based thermoplastic resin composition by mass polymerization.

The manufacturing method according to one embodiment of the present invention is characterized by comprising: a pre-polymerization step of manufacturing a particle core by polymerizing the first vinyl-based monomer, the second vinyl-based monomer and a pre-polymerization initiator (Step 1); and a post-polymerization step of adding the first vinyl-based monomer, the second vinyl-based monomer and a post-polymerization initiator to the particle core and then polymerizing thereof (Step 2), wherein the metal complex agent is inserted in the pre-polymerization step, or the pre-polymerization step and the post-polymerization step.

The Step 1 is a step for manufacturing the particle core by pre-polymerization, and the pre-polymerization may be conducted by polymerizing the first vinyl-based monomer, the second vinyl-based monomer and the pre-polymerization initiator as mentioned above.

Specifically, the first vinyl-based monomer and the second vinyl-based monomer may contains iron ions of different concentration from each other as mentioned above, and may have weight ratio of 1.2 to 1.8:1. The specific iron ion concentration inside of the first vinyl-based monomer and the second vinyl-based monomer may be as mentioned above.

The pre-polymerization may be conducted by, for example, inserting the first vinyl-based monomer and the second vinyl-based monomer into a reactor deaerated by high vacuum, and then while heating and stirring thereof, inserting the pre-polymerization initiator thereinto for polymerization, but not limited thereto. At this time, the polymerization may be conducted by maintaining reaction pressure of 9.5 K/G to 12.5 K/G and reaction temperature of 75° C. to 95° C., preferably, but not limited thereto.

The pre-polymerization may be conducted when polymerization conversion rate reaches 7% to 13%. At this time, the polymerization conversion rate can be measured by using a Butane tracer equipped with gas chromatography.

The pre-polymerization initiator may be used in an amount of 0.05 part by weight to 1 part by weight, based on the total 100 parts by weight of the first vinyl-based monomer and the second vinyl-based monomer of the pre-polymerization step. If the amount of the pre-polymerization initiator is less than 0.05 part by weight, productivity may be worse due to longer polymerization time, and if the amount is greater than 1 part by weight, properties of the finally manufactured vinyl-based thermoplastic resin may be deteriorated because the amount of the pre-polymerization initiator remained even after the reaction is completed is increased.

The pre-polymerization initiator may be a material having half-life of 1 hour in a temperature range of 55° C. to 70° C., but not limited thereto. Specifically, the initiator may be at least one selected from the group consisting of cumyl peroxyneodecanoate, 1,1,3,3,-tetramethyl butyl peroxyneodecanoate, t-hexyl peroxyneodecanoate, t-butyl peroxyneodecanoate, t-hexyl peroxypivalate, t-butyl peroxypivalate, di-sec-butyl peroxydicarbonate, di-2-ethoxyethyl peroxydicarbonate, di-2-ethoxyethyl peroxydicarbonate, di-2-ethylhexyl peroxydicarbonate, isobutyryl peroxide, 3,5,5-trimethylhexanoyl peroxide and lauryl peroxide.

The Step 2 is a step for manufacturing the vinyl-based thermoplastic resin composition by growing the particle core manufactured in the Step 1, and may be conducted by adding the particle core, the first vinyl-based monomer, the second vinyl-based monomer and the post-polymerization initiator and then post-polymerizing thereof.

The post-polymerization may be conducted by, for example, transferring the particle core manufactured in the Step 1 to a post-polymerization reactor, and then inserting the first vinyl-based monomer, the second vinyl-based monomer and the post-polymerization initiator thereinto for polymerization, but not limited thereto. At this time, the polymerization may preferably be conducted by maintaining reaction pressure of 7.5 K/G to 8.5 K/G and reaction temperature of 60° C. to 80° C., but not limited thereto.

The post-polymerization initiator may be the same with the pre-polymerization initiator mentioned above, and the amount thereof may be the same with that of the pre-polymerization initiator and in the same range thereof.

The post-polymerization may comprise a step of stopping the polymerization by inserting the polymerization inhibitor when the polymerization conversion rate reaches 75% to 85%.

The polymerization inhibitor plays a role in completing the reaction by inhibiting exothermic reaction locally occurring in the latter part of the polymerization and removing the residual unreacted radicals, and the inhibitor may be at least one selected from the group consisting of hydroquinone-based compound, phenyl-based compound, amine-based compound and aldehyde-based compound, but not particularly limited thereto.

On the other hand, the manufacturing method may preferably comprise a step of inserting the metal complex agent in the pre-polymerization step, or in the pre-polymerization step and the post-polymerization step as mentioned above. The metal complex agent may play a role in removing iron ions inside of the second vinyl-based monomer, thereby improving thermal stability of the vinyl-based thermoplastic resin.

Specifically, the metal complex agent may be inserted at the pre-polymerization step in bulk, or inserting a part of the metal complex agent in the pre-polymerization step and then inserting the rest of the metal complex agent in the post-polymerization step. Specifically, the metal complex may be inserted in the pre-polymerization step in bulk.

At this time, the total insert amount of the metal complex agent may be 0.05 part by weight to 0.5 part by weight based on the total 100 parts by weight of the first vinyl-based monomer and the second vinyl-based monomer.

Specific kinds of the metal complex agent may be as mentioned above.

Further, the manufacturing method according to the present invention may further comprise a step of recovering the residual unreacted monomer after the post-polymerization step, and the recovery may be conducted at a temperature range of 70° C. to 80° C.

Moreover, the present invention provides a vinyl-based thermoplastic resin manufactured from the vinyl-based thermoplastic resin composition.

The vinyl-based thermoplastic resin according to one embodiment of the present invention is characterized by having iron ion concentration of 0.1 ppm or less and metal complex agent concentration of 50 ppm or more.

Specifically, the vinyl-based thermoplastic resin may have iron ion concentration of 0.03 ppm to 0.1 ppm and metal complex agent concentration of 50 ppm to 90 ppm.

MODE FOR THE INVENTION

Hereinafter, the present invention will be described in more detail, according to the following Examples and Test Examples. However, the following Examples and Test Examples are merely presented to exemplify the present invention, and the scope of the present invention is not limited thereto.

Hereinafter, iron ion concentration in the second vinyl-based monomer was calculated by manufacturing standard solutions per each concentration by treating ammonium iron(II) sulfate hexahydrate with sulfuric acid and bromine water, making calibration curve of the iron ion at maximum absorption wavelength of 540 nm by using a visible-UV spectrometer, and then substituting the absorbance at 540 nm to the obtained calibration curve of the second vinyl-based monomer.

Example 1

The first vinyl-based monomer 85 kg, the second vinyl-based monomer 50 kg (iron ion concentration: 17 ppm), and tetra-sodium pyrophosphate 105 g were inserted into a pre-polymerization reactor (Volume: 0.2 m$^3$) deaerated by high vacuum, di-2-ethyl hexyl peroxydicarbonate 80 g was inserted thereinto, and then pressure of the reactor was raised up to 12 K/G while maintaining stirring to manufacture a particle core having conversion rate of 10%.

The first vinyl-based monomer 48 kg and the second vinyl-based monomer 27 kg (iron ion concentration: 17 ppm) were inserted into a post-polymerization reactor (Volume: 0.5 m$^3$), the particle core was transferred from the pre-polymerization reactor, 1,1,3,3-tetramethyl butyl peroxyneodecanoate 170 g was inserted thereinto, and then polymerization was conducted at a pressure of 7 K/G for 180 min while maintaining stirring. At the end of the polymerization, butylated hydroxy toluene 200 g was inserted thereinto, residual unreacted vinyl-based monomer was recovered under vacuum for 30 min while maintaining stirring to obtain a vinyl-based thermoplastic resin.

Example 2

The procedure of Example 1 was repeated except for using the second vinyl-based monomer having iron ion concentration of 18 ppm and inserting tetra-sodium pyrophosphate 210 g thereinto to obtain a vinyl-based thermoplastic resin.

Example 3

The procedure of Example 1 was repeated except for inserting tetra-sodium pyrophosphate 420 g to obtain a vinyl-based thermoplastic resin.

Example 4

The procedure of Example 1 was repeated except for inserting tetra-sodium pyrophosphate 1,050 g to obtain a vinyl-based thermoplastic resin.

Example 5

The first vinyl-based monomer 80 kg, the second vinyl-based monomer 55 kg (iron ion concentration: 18 ppm), and tetra-sodium pyrophosphate 168 g were inserted into a pre-polymerization reactor (Volume: 0.2 m$^3$) deaerated by high vacuum, di-2-ethyl hexyl peroxydicarbonate 80 g was inserted thereinto, and then pressure of the reactor was raised up to 12 K/G while maintaining stirring to manufacture a particle core having conversion rate of 10%.

The first vinyl-based monomer 44 kg and the second vinyl-based monomer 31 kg (iron ion concentration: 18 ppm) were inserted into a post-polymerization reactor (Volume: 0.5 m$^3$), the particle core was transferred from the pre-polymerization reactor, 1,1,3,3-tetramethyl butyl peroxyneodecanoate 170 g was inserted thereinto, and then polymerization was conducted at a pressure of 7 K/G for 180 min while maintaining stirring. At the end of the polymerization, butylated hydroxy toluene 200 g was inserted thereinto, residual unreacted vinyl-based monomer was recovered under vacuum for 30 min while maintaining stirring to obtain a vinyl-based thermoplastic resin.

Example 6

The procedure of Example 5 was repeated except for inserting tetra-sodium pyrophosphate 210 g to obtain a vinyl-based thermoplastic resin.

Example 7

The first vinyl-based monomer 75 kg, the second vinyl-based monomer 60 kg (iron ion concentration: 19 ppm), and tetra-sodium pyrophosphate 210 g were inserted into a pre-polymerization reactor (Volume: 0.2 m$^3$) deaerated by high vacuum, di-2-ethyl hexyl peroxydicarbonate 80 g was inserted thereinto, and then pressure of the reactor was raised up to 12 K/G while maintaining stirring to manufacture a particle core having conversion rate of 10%.

The first vinyl-based monomer 40 kg and the second vinyl-based monomer 35 kg (iron ion concentration: 19 ppm) were inserted into a post-polymerization reactor (Volume: 0.5 m$^3$), the particle core was transferred from the pre-polymerization reactor, 1,1,3,3-tetramethyl butyl peroxyneodecanoate 170 g was inserted thereinto, and then polymerization was conducted at a pressure of 7 K/G for 180 min while maintaining stirring. At the end of the polymerization, butylated hydroxy toluene 200 g was inserted thereinto, residual unreacted vinyl-based monomer was recovered under vacuum for 30 min while maintaining stirring to obtain a vinyl-based thermoplastic resin.

Example 8

The procedure of Example 7 was repeated except for inserting tetra-sodium pyrophosphate 315 g to obtain a vinyl-based thermoplastic resin.

Example 9

The first vinyl-based monomer 85 kg, the second vinyl-based monomer 50 kg (iron ion concentration: 18 ppm), and tetra-sodium pyrophosphate 67.5 g were inserted into a pre-polymerization reactor (Volume: 0.2 m$^3$) deaerated by high vacuum, di-2-ethyl hexyl peroxydicarbonate 80 g was inserted thereinto, and then pressure of the reactor was raised up to 12 K/G while maintaining stirring to manufacture a particle core having conversion rate of 10%.

The first vinyl-based monomer 48 kg, the second vinyl-based monomer 27 kg (iron ion concentration: 18 ppm) and tetra-sodium pyrophosphate 37.5 g were inserted into a post-polymerization reactor (Volume: 0.5 m$^3$), the particle core was transferred from the pre-polymerization reactor, 1,1,3,3-tetramethyl butyl peroxyneodecanoate 170 g was inserted thereinto, and then polymerization was conducted at a pressure of 7 K/G for 180 min while maintaining stirring. At the end of the polymerization, butylated hydroxy toluene 200 g was inserted thereinto, residual unreacted vinyl-based monomer was recovered under vacuum for 30 min while maintaining stirring to obtain a vinyl-based thermoplastic resin.

Example 10

The procedure of Example 1 was repeated except for using the second vinyl-based monomer having iron ion concentration of ppm and using ethyldiamine acetic acid instead of tetra-sodium pyrophosphate to obtain a vinyl-based thermoplastic resin.

Example 11

The procedure of Example 1 was repeated except for using the second vinyl-based monomer having iron ion concentration of 18 ppm and using ethyleneglycol acetic acid instead of tetra-sodium pyrophosphate to obtain a vinyl-based thermoplastic resin.

Comparative Example 1

The procedure of Example 1 was repeated except for not inserting the tetra-sodium pyrophosphate to obtain a vinyl-based thermoplastic resin.

Comparative Example 2

The procedure of Example 1 was repeated except for not inserting the first vinyl-based monomer and the tetra-sodium pyrophosphate to obtain a vinyl-based thermoplastic resin.

Comparative Example 3

The procedure of Example 1 was repeated except for not inserting the second vinyl-based monomer and the tetra-sodium pyrophosphate to obtain a vinyl-based thermoplastic resin.

Comparative Example 4

The procedure of Example 1 was repeated except for not inserting the first vinyl-based monomer to obtain a vinyl-based thermoplastic resin.

Comparative Example 5

The procedure of Example 1 was repeated except for inserting tetra-sodium pyrophosphate 50 g to obtain a vinyl-based thermoplastic resin.

Comparative Example 6

The procedure of Example 4 was repeated except for inserting tetra-sodium pyrophosphate 1,200 g to obtain a vinyl-based thermoplastic resin.

Comparative Example 7

The procedure of Example 1 was repeated except for inserting the first vinyl-based monomer 70 kg and second vinyl-based monomer 65 kg when manufacturing the particle core, and inserting the first vinyl-based monomer 40 kg and the second vinyl-based monomer 35 kg in the post-polymerization step to obtain a vinyl-based thermoplastic resin.

Comparative Example 8

The procedure of Example 1 was repeated except for inserting the first vinyl-based monomer 90 kg and second vinyl-based monomer 50 kg when manufacturing the particle core, and inserting the first vinyl-based monomer 47 kg and the second vinyl-based monomer 23 kg in the post-polymerization step to obtain a vinyl-based thermoplastic resin.

Comparative Example 9

The procedure of Example 1 was repeated except for not inserting the tetra-sodium pyrophosphate when manufacturing the particle core but inserting thereof in the post-polymerization step to obtain a vinyl-based thermoplastic resin.

Test Example

Properties of each of the vinyl-based thermoplastic resins manufactured in Examples 1 to 11 and Comparative Examples 1 to 9 were comparatively analyzed. The results were shown in the following Table 1.

1) Iron Ion Concentration

Each of vinyl-based thermoplastic resins of Examples 1 to 11 and Comparative Examples 1 to 9 was pretreated by heating thereof at pressure of 35 K/G and temperature of 150° C. using a microwave sample melting device, and then iron ion concentration in each resin was analyzed by using a high frequency inductively coupled plasma mass spectrometry.

2) Metal Complex Agent Concentration

Each of vinyl-based thermoplastic resins of Examples 1 to 11 and Comparative Examples 1 to 9 was completely melted in cyclohexanone to manufacture an extract, and metal complex agent concentration in each resin was measured from the extract by using gas chromatography and ion chromatography analyzing devices.

3) Thermal Stability Analysis

A tin-based stabilizing agent 4 parts by weight, a lubricant 0.5 part by weight, an acryl-based processing aid 1 part by weight and an impact modifier 6 parts by weight were added to each of vinyl-based thermoplastic resins 100 part by weight of Examples 1 to 11 and Comparative Examples 1 to 9 and then blended at 185° C. for 3 min using a roll to manufacture a 0.3 mm-thick sheet. The manufactured sheet was cut, overlapped and then press-molded under conditions of pre-heating at 185° C. for 2 min and then pressing at low pressure for 3 min. Then, the resulting sheet was quenched at high pressure for 2 min to manufacture a 30 mm-thick processed sample. Whiteness index (W.I), yellow index (Y.I), transparency (T) and turbidity (H) of each processed sample were measured by using a L, a, b method to use thereof as an index of thermal stability. The higher whiteness index and turbidity mean the better quality, and the lower yellow index and transparency mean the better quality.

TABLE 1

| Section | Iron ion (ppm) | Metal complex agent (ppm) | Whiteness index (W.I) | Yellow index (Y.I) | Turbidity (H) | Transparency (T) |
|---|---|---|---|---|---|---|
| Example 1 | 0.07 | 54 | 18.25 | 22.56 | 77.59 | 4.37 |
| Example 2 | 0.05 | 69 | 18.29 | 22.53 | 77.64 | 4.33 |
| Example 3 | 0.04 | 74 | 18.31 | 22.51 | 77.65 | 4.32 |
| Example 4 | 0.03 | 89 | 18.32 | 22.49 | 77.64 | 4.31 |
| Example 5 | 0.08 | 57 | 18.22 | 22.60 | 77.49 | 4.40 |
| Example 6 | 0.06 | 71 | 18.27 | 22.56 | 77.60 | 4.33 |
| Example 7 | 0.09 | 73 | 18.24 | 22.58 | 77.55 | 4.40 |
| Example 8 | 0.08 | 80 | 18.27 | 22.56 | 77.59 | 4.38 |
| Example 9 | 0.05 | 51 | 18.26 | 22.55 | 77.56 | 4.31 |
| Example 10 | 0.08 | 55 | 18.23 | 22.59 | 77.50 | 4.39 |
| Example 11 | 0.07 | 52 | 18.20 | 22.61 | 77.49 | 4.42 |
| Comparative Example 1 | 3.39 | — | 13.14 | 23.88 | 73.93 | 7.38 |
| Comparative Example 2 | 8.47 | — | 11.22 | 24.37 | 72.70 | 8.12 |
| Comparative Example 3 | 0.04 | — | 17.02 | 22.68 | 76.04 | 5.03 |
| Comparative Example 4 | 1.97 | 22 | 15.77 | 23.08 | 74.59 | 6.27 |
| Comparative Example 5 | 0.19 | 35 | 17.12 | 22.97 | 76.04 | 5.80 |
| Comparative Example 6 | 0.04 | 76 | 18.30 | 22.54 | 77.69 | 4.30 |
| Comparative Example 7 | 0.12 | 46 | 18.18 | 22.67 | 77.30 | 4.59 |
| Comparative Example 8 | 0.04 | 60 | 18.28 | 22.52 | 77.61 | 4.27 |
| Comparative Example 9 | 1.41 | 61 | 16.34 | 22.87 | 75.77 | 5.82 |

As shown in the Table 1, it was confirmed that the vinyl-based thermoplastic resins of Examples 1 to 11 manufactured by using the first vinyl-based monomer, the second vinyl-based monomer and the metal complex agent according to the present invention showed better properties, compared to the vinyl-based thermoplastic resins of Comparative Examples 1 to 9.

Specifically, the vinyl-based thermoplastic resin of Comparative Example 1 manufactured by polymerizing the first vinyl-based monomer and the second vinyl-based monomer without the metal complex agent and the vinyl-based thermoplastic resin of Comparative Example 2 manufactured by polymerizing only the second vinyl-based monomer without the metal complex agent contained much larger amount of iron ions, compared to the vinyl-based thermoplastic resins of Examples 1 to 11, and whiteness index, yellow index, turbidity and transparency characteristics thereof were reduced. Further, in the case of the vinyl-based thermoplastic resin of Comparative Example 3 manufactured by polymerizing only the first vinyl-based monomer that is a pure monomer having low iron ion content, the degree of iron ion content was equal to that of the vinyl-based thermoplastic resin of Examples 1 to 11, but whiteness index, turbidity and transparency characteristics thereof were bad. This result means that the metal complex agent according to the present invention removes iron ions but is remained inside of the vinyl-based thermoplastic resin at the same time, and therefore, the agent can inhibit dehydrochlorination occurring by thermal deposition during resin processing thereby inhibiting thermal deposition of the resin. Thus, the vinyl-based thermoplastic resin manufactured by using the metal complex agent according to the present invention can improve thermal stability because a certain amount of the metal complex agent is remained in the resin.

Further, the vinyl-based thermoplastic resin of Comparative Example 4 manufactured by using only the second vinyl-based monomer and the metal complex agent without the first vinyl-based monomer showed reduced iron ion concentration due to the metal complex agent but did not show the desired excellent thermal stability characteristic, compared to the vinyl-based thermoplastic resin of Comparative Example 2 polymerized by using only the second vinyl-based monomer. Namely, in order to manufacture the vinyl-based thermoplastic resin having equal level to the vinyl-based thermoplastic resin of Examples 1 to 11, by using only the second vinyl-based monomer without the first vinyl-based monomer, a large amount of metal complex agent is required, and it may cause increase of production cost. Thus, it may be disadvantageous to the process.

Further, the vinyl-based thermoplastic resin of Comparative Example 5 manufactured by polymerizing the first vinyl-based monomer, the second vinyl-based monomer and the metal complex agent, but the amount of the metal complex agent was smaller than the minimum amount of the metal complex agent suggested in the present invention (0.05 part by weight) showed reduced iron ion removing effect and bad whiteness index, yellow index, turbidity and transparency, compared to Example 1 (using the metal complex agent of 0.05 part by weight).

On the other hand, on the contrary to Comparative Example 5, the vinyl-based thermoplastic resin of Comparative Example 6 manufactured by polymerizing the metal complex agent in an amount of more than the maximum amount of the metal complex agent suggested in the present invention (0.5 part by weight) showed the equal level of iron ion removing effect and thermal stability characteristics (whiteness index, yellow index, turbidity and transparency) in spited of using a larger amount of the metal complex agent, compared to Example 4 (using the metal complex agent of 0.5 part by weight). This means that increase rate of the effect may be reduced when the amount of the agent is more than a certain amount and therefore there may be a problem of production cost increase.

Further, in use ratio of the first vinyl-based monomer and the second vinyl-based monomer, the vinyl-based thermoplastic resin of Comparative Example 7 manufactured by polymerizing at the ratio out of the ratio suggested in the present invention of 1.2 to 1.8:1 (about 1.1:1) showed higher iron ion concentration and reduced thermal stability, compared to the vinyl-based thermoplastic resin of Example 7 (1.2:1), and the vinyl-based thermoplastic resin of Comparative Example 8 (about 1.9:1) showed the effect equal to the vinyl-based thermoplastic resin of Example 1 (1.8:1). However, this is caused by the increase of the first vinyl-based monomer amount, thereby reducing the cost reduction effect.

The above results mean that the vinyl-based thermoplastic resin having excellent properties can be obtained by using the first vinyl-based monomer and the second vinyl-based monomer at a ratio suggested in the present invention and also can show the cost reduction effect.

Moreover, the vinyl-based thermoplastic resin of Comparative Example 9 manufactured by inserting the metal complex agent in the polymerization step, not the step of manufacturing the particle core, showed higher iron ion concentration but bad whiteness index, yellow index, turbidity and transparency characteristics, compared to the vinyl-based thermoplastic resin of Examples 1 to 11. This means that the iron ions in the second vinyl-based monomer inserted when manufacturing the particle core are not removed and structural defects has been already generated by the iron ions when manufacturing the particle core thereby reducing thermal stability, and the time of inserting the metal complex agent is a major fact of improving thermal stability of the finally manufactured vinyl-based thermoplastic resin.

The invention claimed is:

1. Vinyl-based thermoplastic resin composition comprising a metal complex agent 0.05 part by weight to 0.5 part by weight, based on a monomer mixture 100 parts by weight,
   wherein the monomer mixture comprises a first vinyl-based monomer and a second vinyl-based monomer,
   wherein the first vinyl-based monomer and the second vinyl-based monomer contain iron ions of different concentration from each other, and
   wherein the second vinyl-based monomer has 100 folds to 300 folds higher iron ion concentration than the iron ion concentration in the first vinyl-based monomer.

2. The vinyl-based thermoplastic resin composition of claim 1, wherein the monomer mixture comprises the first vinyl-based monomer and the second vinyl-based monomer at weight ratio of 1.2 to 1.8:1.

3. The vinyl-based thermoplastic resin composition of claim 1, wherein the second vinyl-based monomer has iron ion concentration of 5 ppm to 30 ppm.

4. The vinyl-based thermoplastic resin composition of claim 1, wherein the metal complex agent is at least one selected from the group consisting of a phosphoric acid-based compound, an alkali metal phosphate-based compound, an aminocarboxylic acid-based compound and an oxycarboxylic acid-based compound.

5. The vinyl-based thermoplastic resin composition of claim 4, wherein the phosphoric acid-based compound is at least one selected from the group consisting of pyrophosphoric acid, tripolyphosphoric acid, pentapolyphosphoric acid, trimetaphosphoric acid, tetrametaphosphoric acid and hexametaphosphoric acid.

6. The vinyl-based thermoplastic resin composition of claim 4, wherein the alkali metal phosphate-based compound is at least one selected from the group consisting of disodium pyrophosphate, trisodium pyrophosphate, tetrasodium pyrophosphate and potassium pyrophosphate.

7. The vinyl-based thermoplastic resin composition of claim 4, wherein the aminocarboxylic acid-based compound is at least one selected from the group consisting of ethylenediamine-N-monoacetic acid, ethylenediamine-N,N'-diacetic acid and ethylenediamine-N,N,N',N'-tetraacetic acid.

8. The vinyl-based thermoplastic resin composition of claim 4, wherein the oxycarboxylic acid-based compound is at least one selected from the group consisting of glycolic acid, gluconic acid, lactic acid, glyceric acid, tartaric acid, malic acid, salicylic acid, gallic acid and citric acid.

9. The vinyl-based thermoplastic resin composition of claim 1, wherein the metal complex agent is at least one selected from the following compounds expressed by Chemical Formulas 1 to 3:

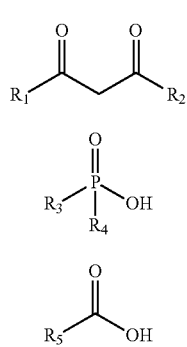

[Chemical Formula 1]

[Chemical Formula 2]

[Chemical Formula 3]

in the Chemical Formula 1, Chemical Formula 2 and Chemical Formula 3,
wherein the $R_1$ to the $R_5$ are each independently $C_{1-10}$ alkyl, $C_{1-10}$ halogenated alkyl, $C_{1-10}$ aryl or $C_{1-10}$ halogenated aryl.

10. A method for manufacturing vinyl-based thermoplastic resin composition by mass polymerization comprising:
a pre-polymerization step of manufacturing a particle core by polymerizing a first vinyl-based monomer, a second vinyl-based monomer and a pre-polymerization initiator; and
a post-polymerization step of adding the first vinyl-based monomer, the second vinyl-based monomer and a post-polymerization initiator to the particle core and then polymerizing thereof,
wherein a metal complex agent is inserted in the pre-polymerization step, or the pre-polymerization step and the post-polymerization step, and
wherein the second vinyl-based monomer has 100 folds to 300 folds higher iron ion concentration than the iron ion concentration in the first vinyl-based monomer.

11. The method for manufacturing vinyl-based thermoplastic resin composition of claim 10, wherein the second vinyl-based monomer has iron ion concentration of 5 ppm to 30 ppm.

12. The method for manufacturing vinyl-based thermoplastic resin composition of claim 10, wherein the metal complex agent is inserted in bulk in the pre-polymerization step.

13. The method for manufacturing vinyl-based thermoplastic resin composition of claim 10, wherein a part of the metal complex agent is inserted in the pre-polymerization step, and the rest of the metal complex agent is inserted in the post-polymerization step.

14. The method for manufacturing vinyl-based thermoplastic resin composition of claim 10, wherein the metal complex agent is inserted in an amount of 0.05 part by weight to 0.5 part by weight, based on the total 100 parts by weight of the first vinyl-based monomer and the second vinyl-based monomer.

15. The method for manufacturing vinyl-based thermoplastic resin composition of claim 10, wherein the metal complex agent is at least one selected from the group consisting of a phosphoric acid-based compound, an alkali metal phosphate-based compound, an aminocarboxylic acid-based compound and an oxycarboxylic acid-based compound.

16. The method for manufacturing vinyl-based thermoplastic resin composition of claim 10, wherein the metal complex agent is at least one selected from the following compounds expressed by Chemical Formulas 1 to 3:

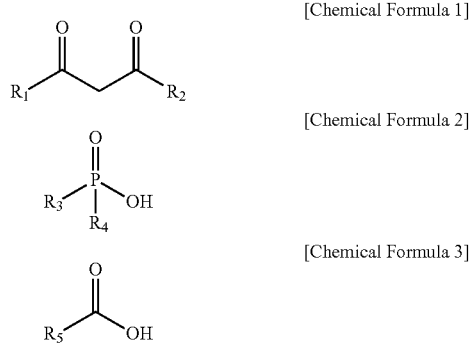

[Chemical Formula 1]

[Chemical Formula 2]

[Chemical Formula 3]

in the Chemical Formula 1, Chemical Formula 2 and Chemical Formula 3,
wherein the $R_1$ to the $R_5$ are each independently $C_{1-10}$ alkyl, $C_{1-10}$ halogenated alkyl, $C_{1-10}$ aryl or $C_{1-10}$ halogenated aryl.

17. The method for manufacturing vinyl-based thermoplastic resin composition of claim 10, wherein the pre-polymerization initiator is used in an amount of 0.05 part by weight to 1 part by weight, based on the total 100 parts by weight of the first vinyl-based monomer and the second vinyl-based monomer of the pre-polymerization step.

18. The method for manufacturing vinyl-based thermoplastic resin composition of claim 10, wherein the post-polymerization initiator is used in an amount of 0.05 part by weight to 1 part by weight, based on the total 100 parts by weight of the first vinyl-based monomer and the second vinyl-based monomer of the pre-polymerization step.

19. The method for manufacturing vinyl-based thermoplastic resin composition of claim 10, wherein the pre-polymerization initiator and the post-polymerization initiator are materials having half-life of 1 hour at a temperature range of 55° C. to 70° C.

20. The method for manufacturing vinyl-based thermoplastic resin composition of claim 19, wherein the pre-polymerization initiator and the post-polymerization initiator are each independently cumyl peroxyneodecanoate, 1,1,3,3,-tetramethyl butyl peroxyneodecanoate, t-hexyl peroxyneodecanoate, t-butyl peroxyneodecanoate, t-hexyl peroxypivalate, t-butyl peroxypivalate, di-sec-butyl peroxydicarbonate, di-2-ethoxyethyl peroxydicarbonate, di-2-ethoxyethyl peroxydicarbonate, di-2-ethylhexyl peroxydicarbonate, isobutyryl peroxide, 3,5,5-trimethylhexanoyl peroxide and lauryl peroxide.

21. The method for manufacturing vinyl-based thermoplastic resin composition of claim 10, wherein the pre-polymerization is conducted under conditions of reaction pressure of 9.5 K/G to 12.5 K/G and reaction temperature of 40° C. to 80° C.

22. The method for manufacturing vinyl-based thermoplastic resin composition of claim 10, wherein the post-polymerization is conducted under conditions of reaction pressure of 7.5 K/G to 8.5 K/G and reaction temperature of 60° C. to 80° C.

23. The method for manufacturing vinyl-based thermoplastic resin composition of claim 10, which further comprises a step of stopping polymerization by inserting a polymerization inhibitor when polymerization conversion rate of the post-polymerization step reaches 75% to 85%.

24. The method for manufacturing vinyl-based thermoplastic resin composition of claim 23, wherein the polymerization inhibitor is at least one selected from the group consisting of a hydroquinone-based compound, a phenyl-based compound, an amine-based compound and an aldehyde-based compound.

25. The method for manufacturing vinyl-based thermoplastic resin composition of claim 10, which further comprises a step of recovering residual unreacted monomers after the post-polymerization step,
 wherein the recovering is conducted at a temperature range of 70° C. to 80° C.

26. A vinyl-based thermoplastic resin manufactured from the vinyl-based thermoplastic resin composition of claim 1.

27. The vinyl-based thermoplastic resin of claim 26, wherein the resin has iron ion concentration of 0.1 ppm or less and metal complex agent concentration of 50 ppm or more.

\* \* \* \* \*